(12) United States Patent
Mitsdarffer et al.

(10) Patent No.: US 7,058,377 B1
(45) Date of Patent: Jun. 6, 2006

(54) DUAL CHANNEL DOWNCONVERTER FOR PULSED RADIO FREQUENCY MEASUREMENTS

(75) Inventors: Kenneth Bryan Mitsdarffer, Bloomington, IN (US); Lowell Roy Hoover, Bloomington, IN (US); Dean Thelen, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 428 days.

(21) Appl. No.: 10/641,589

(22) Filed: Aug. 14, 2003

(51) Int. Cl.
*H04B 1/16* (2006.01)

(52) U.S. Cl. .................... 455/209; 455/314; 455/303

(58) Field of Classification Search ........... 455/323, 455/326, 330, 333, 343, 131, 149, 207, 209, 455/255, 313–319, 303, 304
See application file for complete search history.

(56) References Cited

U.S. PATENT DOCUMENTS

| | | | |
|---|---|---|---|
| 4,611,165 A | 9/1986 | Nussbaum | 324/77 |
| 5,027,430 A * | 6/1991 | Yamauchi et al. | 455/188.1 |
| 5,179,728 A * | 1/1993 | Sowadski | 455/183.1 |
| 5,493,718 A | 2/1996 | Bayruns et al. | 455/323 |
| 5,508,605 A | 4/1996 | Lo et al. | 324/76.42 |
| 5,524,281 A | 6/1996 | Bradley et al. | 455/67.3 |
| 5,659,894 A * | 8/1997 | Bayruns et al. | 455/323 |
| 5,754,951 A | 5/1998 | Kashima et al. | 455/327 |
| 5,805,460 A | 9/1998 | Greene et al. | 364/486 |
| 6,215,988 B1 * | 4/2001 | Matero | 455/188.1 |
| 2002/0173337 A1 * | 11/2002 | Hajimiri et al. | 455/552 |
| 2003/0161424 A1 * | 8/2003 | Varela et al. | 375/350 |
| 2005/0096004 A1 * | 5/2005 | Tso et al. | 455/334 |
| 2005/0237953 A1 * | 10/2005 | Carrender et al. | 370/278 |

* cited by examiner

*Primary Examiner*—Nguyen T. Vo
*Assistant Examiner*—Nhan T Le
(74) *Attorney, Agent, or Firm*—Michael P. Stanley

(57) ABSTRACT

A dual channel downconverter that includes a two-channel heterodyne receiver architecture for downconverting two frequency-agile, pulsed RF signals to identical fixed IF signals without the use of a tunable local oscillator. This accomplishes downconversion while preserving, in the IF output signals, any amplitude modulations present in the RF signals. The device also preserves phase difference changes present in the RF signals while rejecting the phase modulations common to those input signals. The present device facilitates complex response measurements of pulsed two-port RF devices while operating in a target system such as a radar transmitter, including insertion gain, insertion phase, residual phase noise, error vector magnitude, AM noise, and group delay, all with increased accuracy, good repeatability, good dynamic range, and decreased measurement time.

5 Claims, 3 Drawing Sheets

DUAL CHANNEL DOWNCONVERTER FOR PULSED RADIO FREQUENCY MEASUREMENTS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to the measurement of pulsed radio frequency (RF) devices and, more particularly, to the conversion of pulsed RF signals into fixed intermediate frequency (IF) signals and, even more particularly, to a dual channel downconverter for automatically converting the input and output RF signals of a pulsed two-port RF device into fixed IF signals while preserving the relative amplitude and phase of the RF signals.

2. Description of the Background

The task of measuring pulsed two-port RF device parameters with sub-microsecond pulse widths is growing more complex. Simultaneously, the need for test, or measurement, systems combining improved accuracy with reduced cost is also increasing. The present inventors are not the first to address means for measuring pulsed RF signals such as dual channel downconverters. For example, dual channel, or two-band, downconverters are found in U.S. Pat. No. 5,754,951 to Kashima et al., U.S. Pat. No. 5,659,894 and U.S. Pat. No. 5,493,718 to Bayruns et al. and U.S. Pat. No. 5,027,430 to Yamauchi. Additional means for measuring pulsed RF signals are found in U.S. Pat. No. 5,805,460 to Greene et al., U.S. Pat. No. 5,524,281 to Bradley et al., U.S. Pat. No. 5,508,605 to Lo et al., and U.S. Pat. No. 4,611,165 to Nussbaum.

U.S. Pat. No. 5,754,951 to Kashima et al. discloses a microwave mixing circuit of a small size for selecting a signal to be received out of plural microwave signal inputs and a downconverter for converting it to an intermediate frequency signal. A first microwave input signal is applied to a first microwave signal input unit and is guided through a bias terminal from a comparator into a mixer diode (to which a bias current is supplied). The first input signal is converted in frequency by the mixer diode. A second microwave input signal is applied to a second microwave signal input unit and is guided through the bias terminal from the comparator into a mixer diode (to which bias current is not supplied). Hence, the second signal is not converted in frequency by the mixer diode. As a result, only an intermediate frequency signal corresponding to the first microwave signal appears at the intermediate frequency signal output terminal. Unfortunately, this device is intended for simultaneous processing of two oppositely polarized satellite broadcasting/communication signals and is, therefore, wholly inadequate for converting the input and output RF signals of a pulsed two-port RF device into fixed IF signals while preserving the relative amplitude and phase of the RF signals.

U.S. Pat. Nos. 5,659,894 and 5,493,718 to Bayruns et al. disclose an electrical circuit forming a dual-channel low current Low Noise Block (LNB) downconverter comprising two downconverting circuits electrically connected in series with each other and each electrically connected in parallel with a Zener diode such that power consumption is minimized and component life improved. Unfortunately, as with the Kashima et al. device above, these dual channel downconverters were intended for use in the simultaneous processing of two oppositely polarized television signals and cannot be used to convert the input and output RF signals of a pulsed two-port RF device into fixed IF signals.

U.S. Pat. No. 5,027,430 to Yamauchi et al. discloses a low noise converter for satellite broadcast reception incorporating a two-band LNB downconverter for receiving two frequency bands. The low noise converter is capable of receiving a plurality of bands in one converter. Unfortunately, this two-band device was conceived merely to increase the bandwidth capability of downconverters.

U.S. Pat. No. 5,805,460 to Greene et al. discloses a method for measuring the rise/fall time and pulse width of RF pulses using multi-purpose, commercial-off-the-shelf test devices, such as an RF signal down converter, a digitizer and a signal processor. The method is based on digitizing the RF signals and developing an average sample pulse waveform. The rise/fall time and pulse width are then calculated from data points on the sample waveform. Unfortunately, this mathematical method/algorithm requires a local oscillator and fails to provide amplitude and phase measurements.

U.S. Pat. No. 5,524,281 to Bradley et al. discloses a measurement system that comprises a source circuit for receiving feedback signals and providing respective signals at respective discrete frequencies in a prescribed microwave frequency range (wherein the respective provided signals at respective discrete frequencies are substantially phase locked to at least one downconverted signal in response to the feedback signals), a downconverting circuit for linearly downconverting the respective signals and providing the at least one respective downconverted signal, and a phase detector circuit for receiving the at least one respective downconverted signal and for providing the feedback signals. Unfortunately, this device is merely a vector network analyzer that includes a local oscillator.

U.S. Pat. No. 5,508,605 to Lo et al. discloses a method for measuring the frequency of a stream of RF pulses using multi-purpose, commercial-off-the-shelf test devices, such as an RF signal down converter, a digitizer, and a signal processor. The method is based on digital signal processing and determining the zero-crossings of the signal using signal interpolation of the pulse points. Unfortunately, once again, this mathematical method/algorithm requires a local oscillator and fails to provide amplitude and phase measurements.

U.S. Pat. No. 4,611,165 to Nussbaum discloses a method and apparatus for determining the RF carrier frequency of a stream of pulse RF signals. A stream of pulse RF signals is dithered and subsequently fed into a frequency spectrum analyzer. A spectrum analysis of the dithered stream of RF pulses or signals derived therefrom provides improved resolution in the measurement of the RF frequency of the pulse RF signals. Unfortunately, this measurement apparatus provides only frequency data.

Current techniques for measuring the complex response (i.e. amplitude and phase) of a pulsed two-port RF device (e.g. an amplifier) involve complicated and expensive test instruments. A pulsed vector network analyzer system (VNA) is commonly used to measure the complex response of a pulsed two-port RF device by providing a stimulus to the device under test (DUT) and then measuring the amplitude and phase.

However, a pulsed VNA has inherent limitations when used to measure the complex response of a pulsed two-port device that is a subcomponent of a radar transmitter.

FIG. 1 is a schematic representation of a system 10 incorporating a pulsed VNA 12 used to measure the complex response of a pulsed two-port RF device 14 in a radar transmitter. An expensive tunable local oscillator (LO) 16 must be controlled by the VNA controller 18 to downconvert samples of the DUT input signal 20 and output signal 22 to fixed IF signals 24, 26, respectively. The VNA's LO frequency must be constantly controlled to maintain the IF frequency separation between the LO 16 and the RF stimulus 28 to the DUT 14. This limitation usually requires the VNA controller 18 to control the RF stimulus 28 to the DUT 14 and to tune the LO 16 to maintain fixed IF signals 24, 26.

Thus, while the concepts of dual channel downconverters and pulsed RF signal measurement devices are fairly well-known, none of the foregoing apparatus/methods comprise a dual channel downconverter without an associated local oscillator that is specifically intended for measuring and analyzing the complex response (i.e. amplitude and phase data) of pulsed RF signals. It becomes difficult to use a VNA when analyzing a pulsed two-port RF device in a radar transmitter where the stimulus to the DUT is a complex pulsed waveform with frequency tuning and modulation of the RF carrier. This RF stimulus to the DUT is usually already present and it would be undesirable to replace it with the VNA's stimulus. It is equally impractical for the VNA to maintain a fixed IF in the VNA's downconverter because complex frequency tuning and modulation of the VNA's LO is required.

Consequently, it would be greatly advantageous to provide a dual channel downconverter that (1) measures/analyzes the complex response of pulsed RF signals originating in a pulsed two-port RF device in a radar transmitter, (2) does not require a tunable local oscillator, (3) possesses a simple design incorporating durable, commercially available components/devices, and (4) may be economically produced to provide for widespread use.

SUMMARY OF THE INVENTION

It is, therefore, the primary object of the present invention to provide a dual channel downconverter capable of measuring and analyzing the complex response (i.e. amplitude and phase data) of pulsed RF signals originating in a pulsed two-port RF device in a radar transmitter.

It is another object of the present invention to provide a dual channel downconverter that does not require a tunable local oscillator.

Still another object of the present invention to provide a dual channel downconverter that possesses two separate and distinct downconverting signal channels that generate distinctive fixed-IF outputs.

Another object of the present invention to provide a dual channel downconverter that provides for decreased measurement time, thereby allowing high frequency pulses to be measured accurately and repeatably with good dynamic range.

Yet another object of the present invention is to provide a dual channel downconverter that possesses a simple design incorporating durable, commercially available components/devices.

It is another object of the present invention to provide a dual channel downconverter that may be economically produced to provide for widespread use.

These and other objects are accomplished by a dual channel downconverter possessing a simple design, incorporating durable, commercially available components/devices, that may be economically produced to provide for widespread use. That design includes a two-channel heterodyne receiver architecture (i.e. two separate and distinct downconverting signal channels) that downconverts two frequency-agile, pulsed RF signals to identical fixed IF signals without the use of a tunable local oscillator. The present invention accomplishes the downconversion while preserving, in the IF output signals, any amplitude modulations present in the RF signals. The present invention also preserves phase difference changes present in the RF signals while rejecting the phase modulations common to those input signals. The present invention has two RF input ports and two, corresponding IF output ports and facilitates the complex response measurements of pulsed two-port RF devices while operating in a target system such as a radar transmitter. When used for a complex response measurement of this type, the present invention's IF outputs can be digitized and processed to obtain insertion gain, insertion phase, residual phase noise, error vector magnitude, AM noise, and group delay. IF measurement techniques incorporating the present invention provide for decreased measurement time, thereby allowing high frequency (i.e. sub-microsecond) pulses to be measured accurately and repeatably with good dynamic range. Additional novel features of the present invention include:

i. The ability to produce fixed IF outputs that contain amplitude and relative phase information for the signal incident upon a pulsed two-port device under test and the signal transmitted through a pulsed two-port device under test.

ii. An automatic real time sidestep local oscillator generator that provides for the fixed IF downconversion of two RF signals that are pulsed, frequency tuned, and modulated (e.g. a radar transmitter). This avoids the need for separate LO sources.

iii. The ability to reject RF amplifier phase changes within a two-channel downconverter such that the phase difference of two RF input signals is tracked by their downconverted IF output signals.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 2:
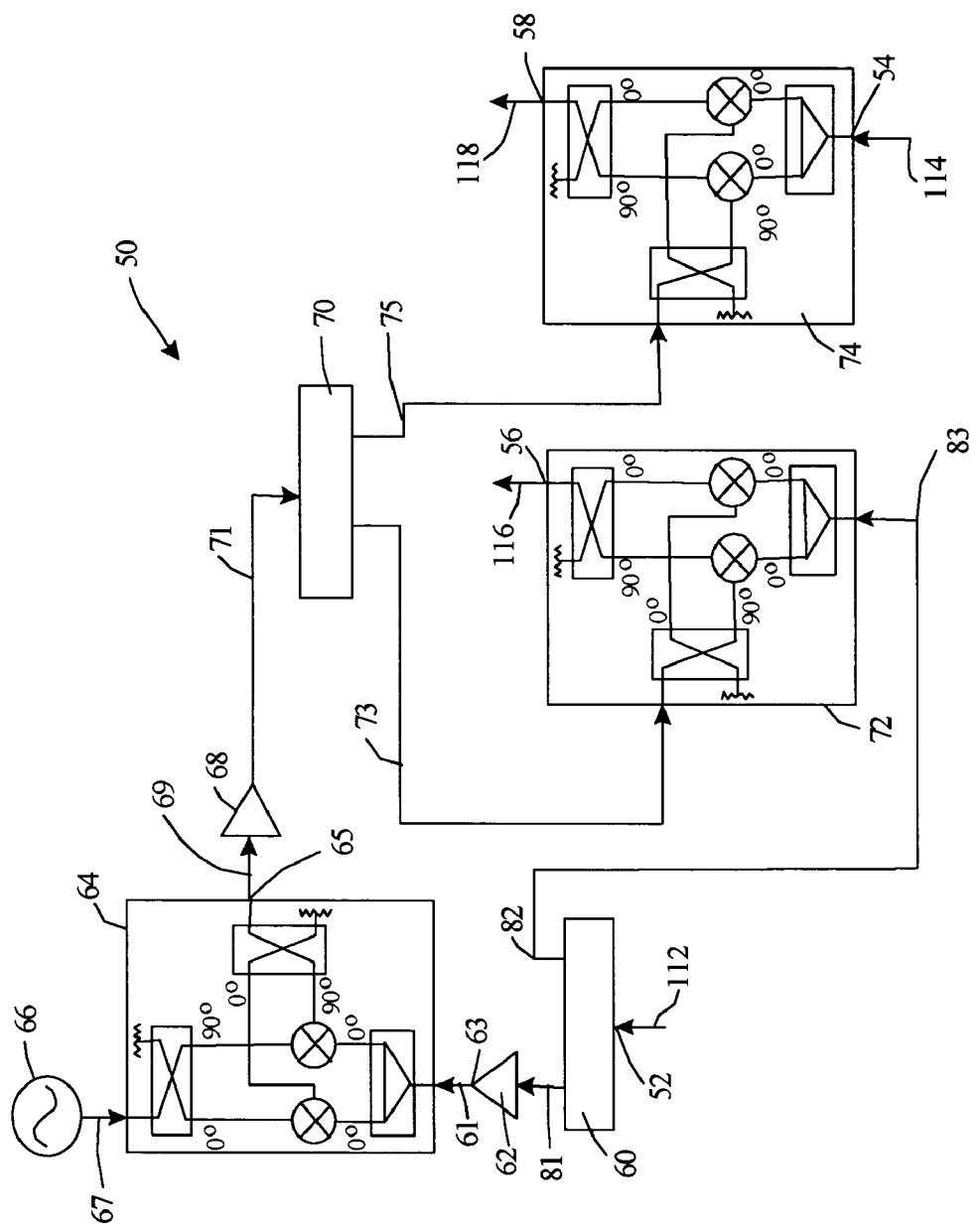
FIG. 2 is a schematic representation of a dual channel downconverter 50 according to a preferred embodiment of the present invention.
Figure 3:
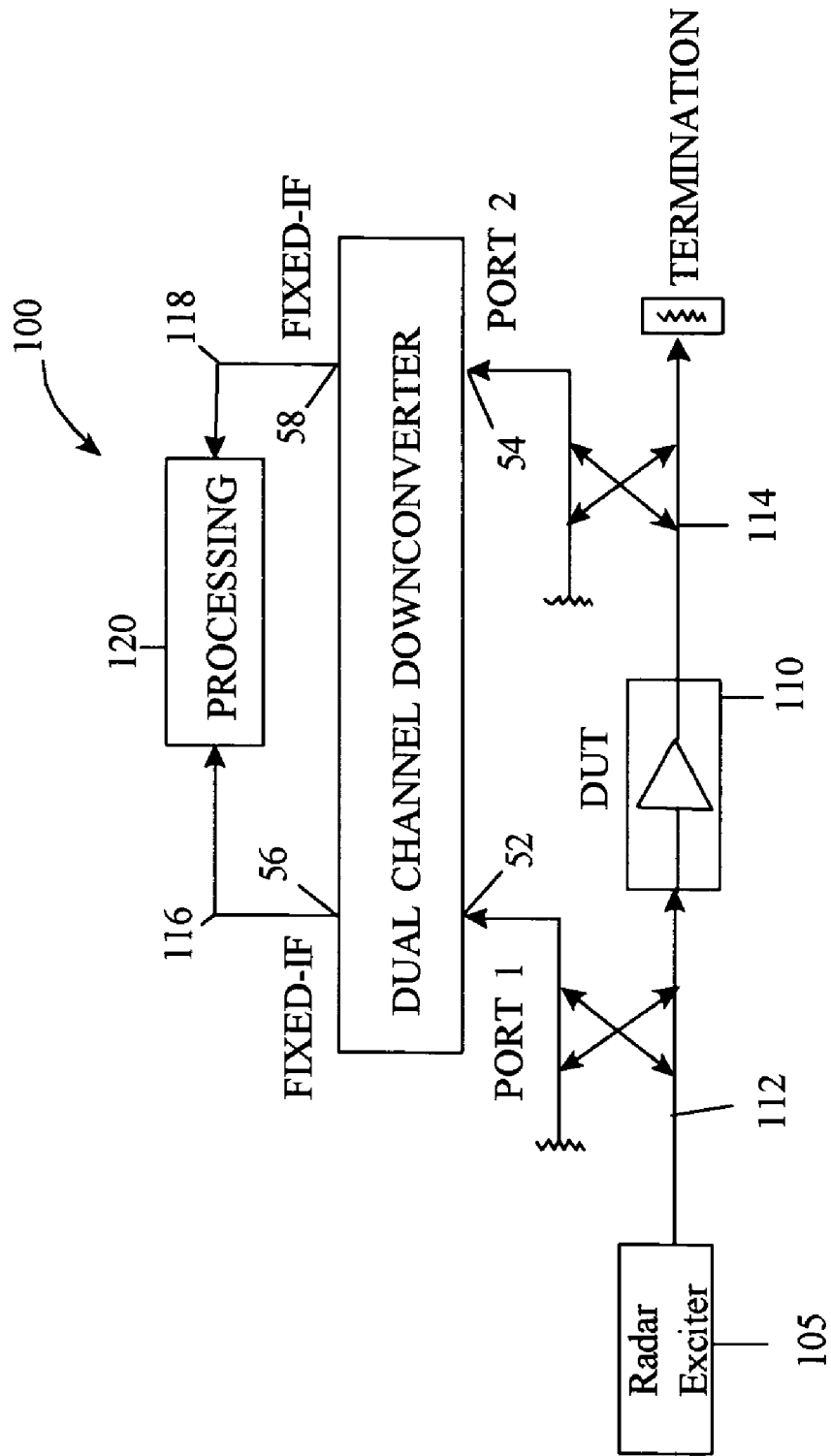
FIG. 3 is a schematic representation of a measurement system 100, incorporating the downconverter 50 of FIG. 2, used to measure the complex response of a pulsed two-port RF device 110 in a radar transmitter 105.

FIG. 2 is a schematic representation of a dual channel downconverter 50 according to a preferred embodiment of the present invention. FIG. 3 provides a schematic representation of the dual channel downconverter 50 as used in a complex response measurement system 100.

The dual channel downconverter 50 incorporates the architecture of a two-channel heterodyne receiver that downconverts two frequency-agile, pulsed RF signals 112, 114 to fixed IF signals 116, 118 without the use of an expensive tunable local oscillator ("LO"). The present dual channel downconverter 50 has two RF input ports 52, 54, and two corresponding downconverted IF output ports 56 and 58. A sample of the RF signal 112 incident upon the two-port DUT 110 is input to port 52 and a sample of the RF signal 114 transmitted through the DUT 110 is input at port 54.

The RF signal 112 input at port 52 is split into two paths 81, 82 by a power divider 60. One output 81 of the power divider 60 is used for the generation of a sidestepped LO used for downconversion while the other output 82 is used as the RF signal 83 to be downconverted to a fixed IF signal 116 at output port 56. The RF output 81 of the power divider 60 used for LO generation is first passed through a limiting RF amplifier 62. The limiting amplifier 62 is operated in saturation such that a constant peak output power is maintained at its output port 63.

The output signal 61 of the limiting amplifier 62 and the output signal 67 of a fixed-frequency IF clock 66 are input to the inphase and quadrature (I/Q) mixer network 64. The I/Q mixer network 64 produces a preferred upper sideband (USB) signal 69 at its output port 65 as a result of the mixing of the two input signals 61, 67. The lower sideband (LSB) signal of the mixing operation is rejected through the phasing of the IQ mixer network 64.

The output signal 69 of the I/Q mixer network 64 is input to a linear RF amplifier 68 and amplified to produce the LO signal 71 used for downconversion. This LO signal 71 is split into two paths 73, 75 by a power divider 70. The output signals 73, 75 of the power divider 70 are used as the LO inputs to two I/Q mixer networks 72, 74. I/Q mixer network 72 produces a fixed IF frequency output signal 116 as a result of the mixing of the two input signals 73, 83. The fixed IF output signal 116 retains the amplitude information present on the input signal 112. The second I/Q mixer network 74 produces a fixed IF frequency output 118 as a result of the mixing of the two input signals 75, 114. The fixed IF output signal 118 retains the amplitude information present on the input signal 114.

The phase difference between the IF output signals 116, 118 tracks phase difference changes in the RF input signals 112, 114. The phase difference between the IF output signals 116, 118 does not depend on the absolute phase of RF input signal 112. In fact, any phase drift in the amplifiers 62, 68 does not affect the phase difference in the IF output signals 116, 118.

Amplitude modulations of the RF signals 112, 114 are preserved in the corresponding IF output signals 116, 118. However, phase modulations common to the RF input signals 112, 114 are rejected in the corresponding IF output signals 116, 118.

When utilized to measure the complex response of a pulsed two-port RF device 110, the dual channel downconverter's IF signal outputs 116/118 may be digitized and processed in a computer 120 to obtain the following parameters; insertion gain, insertion phase, residual phase noise, error vector magnitude, AM noise, and group delay.

The frequency range of the RF input signals 112, 114 is determined by the frequency response of the constituent parts used in the dual channel downconverter 50. The frequency bandwidth of the RF input signals 112, 114 is limited by the frequency of the IF clock 66. To avoid spectrum folding around 0 Hz., the frequency of the IF clock 66 must be chosen to satisfy the following condition:

IF Clock Frequency>½ RF Input Signal Bandwidth

The operating power range of the RF input signals 112, 114 is determined by the linearity requirement of the I/Q mixer networks 72, 74. The RF input signal 83, 114 of the I/Q mixer network 72, 74, respectively, must be kept at least 10 dB below the power level of the corresponding LO input signal 73, 75 to provide linear conversion.

One skilled in the art will understand that alternative embodiments of the present dual channel downconverter 50 are possible without departing from the scope or spirit of the invention, for example, the signal split does not have to be equal in power or phase, may have couplers, hybrids, or any other RF three-port device that splits the input signal into two paths, in place of the power dividers 60, 70.

Additionally, while the I/Q networks 64, 72, 74 shown in FIG. 2 provide a USB LO from network 64 resulting in LSB downconversion in networks 72, 74, this is not the only possible configuration/method of operation. If all of the I/Q networks 64, 72, 74 had the opposite IF hybrid configuration, then the LO generated by network 64 would be LSB resulting in USB downconversion in networks 72, 74. This alternative configuration/method of operation provides equivalent IP output signals 116, 118 once one compensates for spectral mirroring around the IF clock frequency. However, there is no advantage in either configuration/method of operation, the choice is completely arbitrary.

Figure 1:
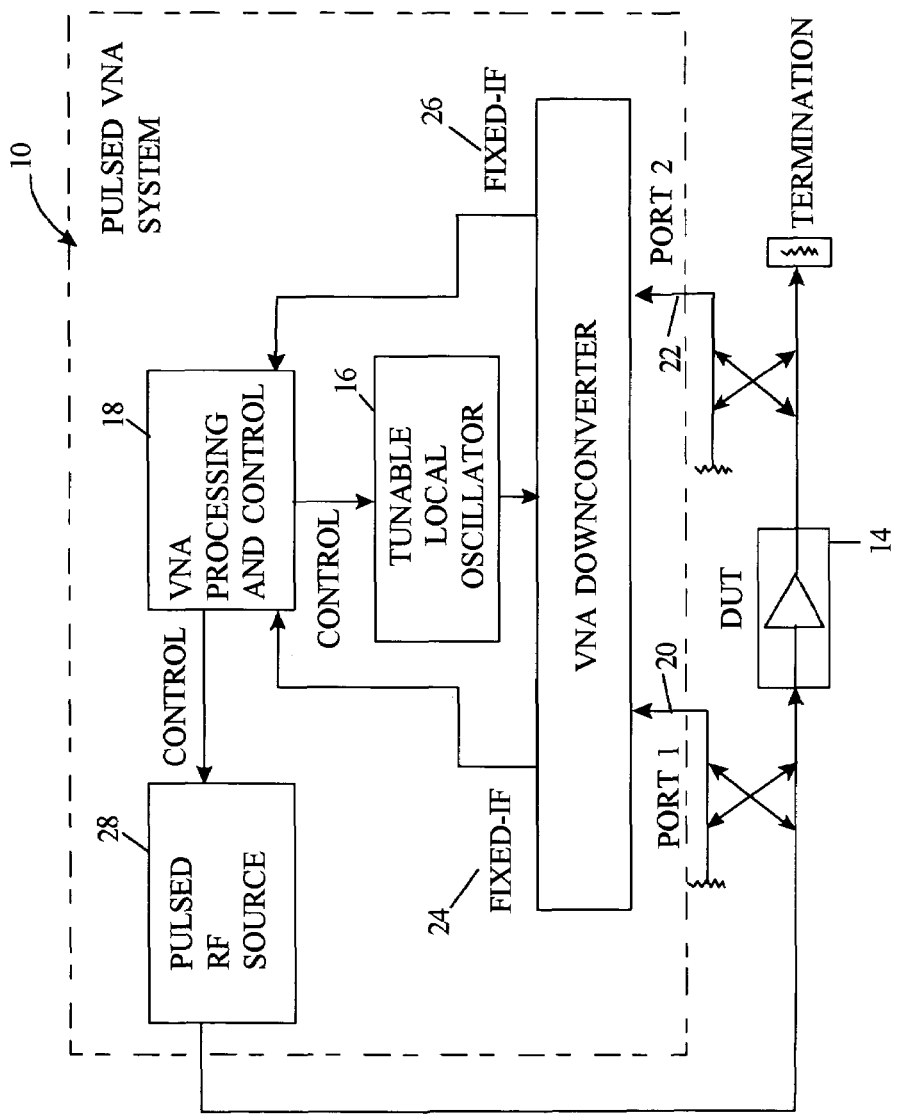
FIG. 1 is a schematic representation of a prior art VNA 10 used to measure the complex response of a pulsed two-port RF device 14 in a radar transmitter.

Typical radar exciter RF signals are precisely timed series of RF pulses with phase modulation inside each pulse. They may also be agile in RF frequency. It is extremely difficult to generate a suitable LO signal using, as shown in FIG. 1, a VNA 10 in combination with a DUT's input signal 20.

In contrast, the dual channel downconverter 50 of the present invention provides complex response measurements of pulsed two-port RF devices 110 while operating in a target system such as a radar transmitter 105. The radar system's existing exciter can be used to stimulate the DUT 110 with a preferred frequency-agile waveform (signal 112) with modulation. There is no need to synthesize an LO signal that maintains a fixed IF frequency. The dual channel downconverter 50 automatically generates the required LO in real time despite frequency tuning and modulation of the incident stimulus signal 112.

The dual channel downconverter 50 of the present invention provides (1) the ability to generate fixed IF output signals 116, 118 that contain amplitude and relative phase information of the signal 112 incident upon a pulsed two-port DUT 110 and the signal 114 transmitted through that pulsed two-port DUT 110, (2) an automatic real time sidestep LO generator that facilitates the fixed IF downconversion of two RF signals 112, 114 that are pulsed, frequency tuned, and modulated, and (3) the ability to reject RF amplifier phase changes within a two-channel downconverter such that the phase difference of two RF input signals 112, 114 is tracked by their downconverted IF output signals 116, 118. IF measurement techniques incorporating the present invention provide for decreased measurement time, thereby allowing high frequency pulses to be measured accurately (e.g. phase values are relatively insensitive to hardware-induced distortions) and repeatably with good dynamic range. Finally, the dual channel downconverter 50 of the present invention possesses a simple design, incorporating durable, commercially available components/devices, that may be economically produced to provide for widespread use.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A dual channel downconverter comprising:
a two-channel heterodyne receiver architecture, said two-channel heterodyne receiver architecture comprising separate and distinct first and second downconverting signal channels;
wherein said second downconverting signal channel comprises;
first and second RF signal input ports;
a first power divider electrically connected to said first RF signal input port;
a first amplifier electrically connected to said first power divider;
a first mixer network electrically connected to said first amplifier;
a fixed-frequency IF clock electrically connected to said first mixer network;
a second amplifier electrically connected to said first mixer network;
a second power divider electrically connected to said second amplifier;
a second mixer network electrically connected to said second RF signal input port and said second power divider; and
a second IF signal output port electrically connected to said second mixer network;
wherein first and second frequency-agile, pulsed RF input signals are downconverted to, respectively, first and second fixed IF output signals without use of a tunable local oscillator.

2. The dual channel downconverter according to claim 1, wherein said first downconverting signal channel further comprises;
a third mixer network electrically connected to said first and said second power dividers; and
a first IF signal output port electrically connected to said third mixer network.

3. A method for downconverting first and second frequency-agile, pulsed RF input signals to, respectively, first and second fixed IF output signals without use of a tunable local oscillator, said method comprising the steps of;
inputting said first RF signal to a first power divider;
splitting said first RF signal into first and second intermediate signals at said first power divider;
inputting said second intermediate signal to a first amplifier;
amplifying said second intermediate signal in said first amplifier;
inputting said amplified second intermediate signal to a first mixer network;
inputting a fixed frequency clock signal to said first mixer network;
mixing said amplified second intermediate signal with said fixed frequency clock signal in said first mixer network to generate a third intermediate signal;
inputting said third intermediate signal to a second amplifier;
inputting said amplified third intermediate signal to a second power divider;
splitting said third intermediate signal into first and second oscillation signals at said second power divider;
inputting said second oscillation signal to a second mixer network;
inputting said second RF signal to said second mixer network;
mixing said second oscillation signal with said second RF signal in said second mixer network to generate said second IF output signal;
inputting said first oscillation signal to a third mixer network;
inputting said first intermediate signal to said third mixer network; and
mixing said first oscillation signal with said first intermediate signal in said third mixer network to generate said first IF output signal.

4. The method for downconverting first and second frequency-agile, pulsed RF input signals to, respectively, first and second fixed IF output signals without use of a tunable local oscillator according to claim 3, wherein amplitude modulations present in said first and second RF input signals are preserved in, respectively, said first and second IF output signals.

5. The method for downconverting first and second frequency-agile, pulsed RF input signals to, respectively, first and second fixed IF output signals without use of a tunable local oscillator according to claim 3, wherein phase difference changes present in said first and second RF input signals are preserved in, respectively, said first and second IF output signals.

* * * * *